United States Patent

Crixell

[15] 3,672,644
[45] June 27, 1972

[54] ROTOR FOR INTENSIVE MIXERS

[72] Inventor: Arthur R. Crixell, Texas City, Tex.
[73] Assignee: Monsanto Company, St. Louis, Mo.
[22] Filed: Dec. 5, 1969
[21] Appl. No.: 882,560

[52] U.S. Cl.....................................259/104, 18/12 SE
[51] Int. Cl. .........................................B01f 7/00, B29b 1/10
[58] Field of Search..................259/104, 6, 21, 41, 64, 9, 259/10, 109, 110, DIG. 7, DIG. 8; 18/12 SE, 12 SZ

[56] References Cited

UNITED STATES PATENTS

| | | |
|---|---|---|
| 2,559,418 | 7/1951 | Ford........................................259/104 |
| 2,573,825 | 11/1951 | Banovsky et al.........................259/6 X |
| 3,468,518 | 9/1969 | Koch.......................................259/104 X |
| 3,348,816 | 10/1967 | Cox.........................................259/104 X |

Primary Examiner—Jordan Franklin
Assistant Examiner—Geo V. Larkin
Attorney—Elizabeth F. Sporar, M. N. Cheairs and Neal E. Willis

[57] ABSTRACT

An improved rotor for use in intensive mixers which reduces leakage of material out of the mixers comprising a substantially cylindrical body having affixed thereto a pair of diagonally disposed spiral lobes, said lobes terminating at the respective ends of the rotor at oppositely opposed end plate sections, the distance between the edges of the lobes adjacent the end face plate sections and the internal wall of the mixing chamber being greater than the distance between the edges of the lobes farthest from the end face plate sections and the internal wall of the mixing chamber.

6 Claims, 3 Drawing Figures

INVENTOR.
Arthur R. Crixell 3,672,644

ROTOR FOR INTENSIVE MIXERS

BACKGROUND OF THE INVENTION

The present invention relates to intensive mixers of the type used to blend and masticate plastics, rubbers, etc. More particularly, the present invention relates to an improved rotor for use in intensive mixers of the type commonly referred to as Banbury mixers.

The commonly known intensive mixers of the type used to masticate and mix plastics and rubbers such as polyethylene, polypropylene, polybutadiene and the like generally comprise a closed mixing chamber formed by two cylinders placed side by side with their long axes in a parallel-horizontal relationship, the cylinders communicating with each other at their adjacent outer peripheral portions resulting in a chamber having a substantially figure-eight cross-sectional area. In each side or "loop" of the chamber a mixing means or rotor is rotatably mounted parallel and concentrically with the long axis of the cylinder, each of the rotors having a pair of generally spiral lobes positioned diagonally to one another across the long axis of the rotor, the edges of the lobes approaching close to the internal walls of the mixing chamber so as to impart shearing to the material being processed. The chamber formed by the two communicating cylinders is closed on the respective ends with suitable end plates through which the rotor shafts extend, the shafts in turn being connected to a suitable drive mechanism located externally of the chamber.

In the processing of plastics and rubbers using mixers such as described above, shear pressures may become very great within the chamber. These rather large pressures coupled with a temperature rise which causes the plastic or rubber to flow easily result in the polymer, rubber, etc., being forced out of the chamber through any openings which exist. More generally, the material is forced out at the ends of the chamber near where the rotor shrouds abut the end plates of the chamber. This leakage of material out of the mixing chamber not only results in a loss of product but more significantly leads to considerable downtime of the mixer due to the fact that the material will accumulate on the rotor seals, shaft and bearings forcing shutdown and repair.

SUMMARY OF THE INVENTION

It is, therefore, an object of the present invention to provide an improved intensive mixer.

It is a further object of the present invention to provide an intensive mixer having an improved rotor.

Yet another object of the present invention is to provide an improved rotor for use in intensive mixers which is as effective as prior art rotors in imparting mixing and shearing to materials but which reduces the leakage of the materials being mixed out of the mixing chamber.

These and other objects of the present invention which will become apparent from the drawings, the description given herein and the appended claims are achieved by an improvement in an intensive mixer of the type having a stationary mixing chamber, said chamber having a substantially figure-eight-shaped cross-sectional area, mixing means rotatably mounted in each half of said chamber to impart mixing and shearing of material contained therein wherein said mixing means comprises a substantially cylindrical rotor having a pair of substantially spiral lobes located diagonally from one another across the long axis of said rotor, said rotor having an end face plate section on each end abutting the ends of said chamber, the lobes terminating at said end face plate sections, the distance between the internal wall of said chamber and the edges of the lobes nearest the end face plate sections being greater than the distance between the internal wall of said chamber and the edges of the lobes located farthest from said end face plate sections, the distance between said internal wall of said chamber and the edges of said end face plate sections being substantially equal to the distance between said internal wall and said edges of said lobes located farthest from said end face plate sections.

DESCRIPTION OF THE PREFERRED EMBODIMENTS

Figure 1:
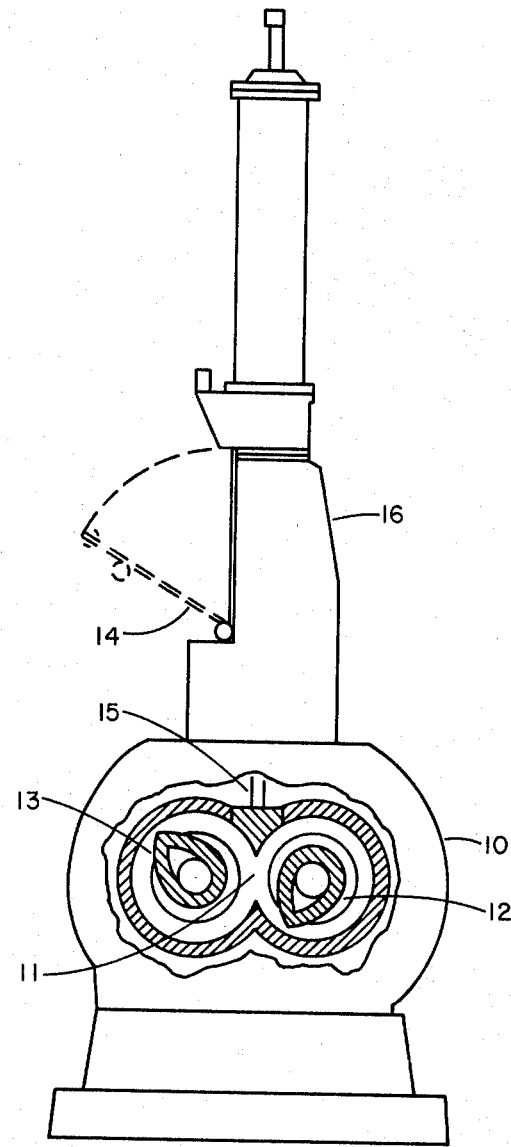
FIG. 1 is a simplified diagram partly in section of a typical intensive mixer.

The invention is best illustrated by reference to the accompanying drawings. Referring now to FIG. 1, there is shown an intensive mixer of the Banbury type having a mixing-chamber body 10 enclosing mixing chamber 11 of substantially figure-eight cross-sectional area. Rotors 12 and 13 are rotatably mounted in each side of chamber 11. Rotors 12 and 13 are generally driven in opposite directions and at different rates of speed so as to cause maximum shearing and mixing of the material. The material to be processed is fed into chamber 11 through hopper door 14 whence it falls into chamber 11 and is maintained therein by means of weighted door 15, the mechanisms to control weighted door 15 and hopper door 14 being contained within housing 16. When the material has been adequately mixed, it is dropped from the bottom of the chamber through a suitable pneumatically or hydraulically actuated sliding door (not shown).

Figure 2:
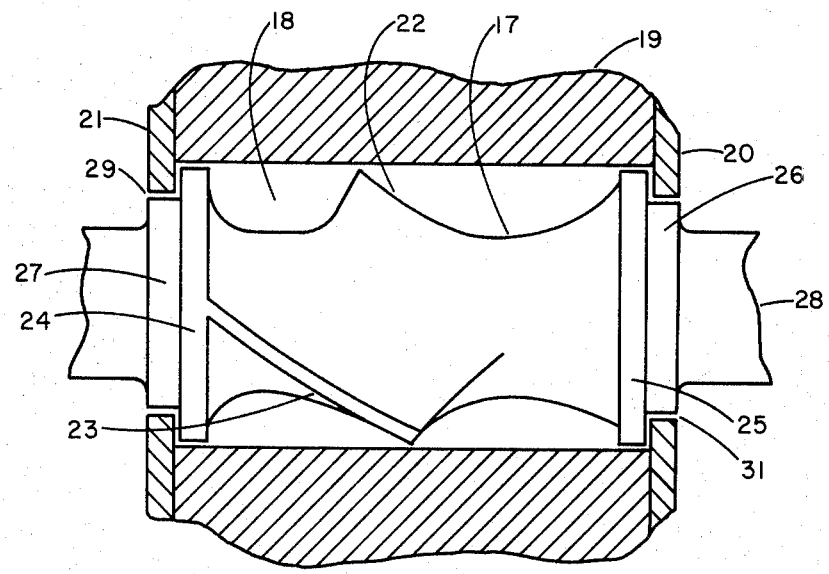
FIG. 2 is a view partly in section of a conventional rotor mounted in the mixing chamber of an intensive mixer such as that shown in FIG. 1.

Reference is now made to FIG. 2 for a description of a typical rotor, such as rotors 12 and 13 shown in FIG. 1, which is conventionally used in intensive mixers of the type commonly referred to as Banbury mixers. For ease of illustration and understanding, only one-half of the mixing chamber containing one rotor is shown. Rotor 17, which is basically comprised of a cylindrical central body having a pair of substantially spiral lobes 22 and 23 disposed diagonally from one another across the long axis of the central body, is mounted within chamber 18 formed by walls 19 and end plates 20 and 21. As is well known by those familiar with intensive mixers, the edges of lobes 22 and 23 approach closely to the inside surface of walls 19, the distance from the inside surface of the walls to the edges of the lobes being substantially constant at all points along the length of the lobe edges. Lobes 22 and 23 terminate at each end of rotor 17 at a pair of oppositely disposed end face plate sections 24 and 25. Bearings 26 and 27 located at each end of chamber 18 serve to rotatably hold rotor 17 in the chamber housing and a suitable power source (not shown) is connected to shaft 28 of rotor 17 to impart rotation thereto. As is evident, due to the close tolerances between the edges of lobes 22 and 23 and the inside surface of walls 19 of the mixing chamber, material which is being mixed in chamber 18 is caused to undergo relatively intense shearing action as it is moved in a substantially figure-eight pattern within chamber 18. This intense shearing action, which leads to rather large pressure buildups within chamber 18, coupled with the consequent rise in temperature experienced by the material being mixed, results in the material being quite fluid. Under these conditions, the material readily leaks through any available openings which usually are clearances 29 and 31 formed where chamber wall 19, end plates 20 and 21, end face plates 24 and 25 and bearings 26 and 27 come together to effect a seal of chamber 18. As explained above, this leakage of material out of chamber 18 can result in damage to the rotor seals and bearings with resultant losses of productivity of the system.

Figure 3:
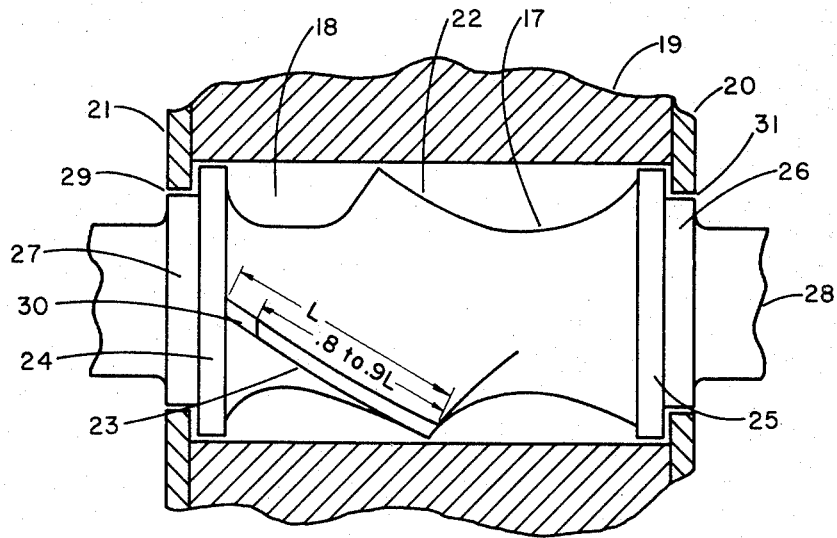
FIG. 3 is a view partly in section of one embodiment of the improved rotor of the present invention mounted in the mixing chamber of an intensive mixer such as that shown in FIG. 1.

Reference is now made to FIG. 3 to show the improved rotor of the present invention. As can be seen, the rotor of FIG. 3 is substantially the same as that shown in FIG. 2 with the exception that lobes 22 and 23 contain a notched portion 30 adjacent where lobes 22 and 23 terminate at end face plate sections 24 and 25. As a result of notch 30, the clearance between the edges of lobes 22 and 23 and the inside surface of walls 19 nearest the point where lobes 22 and 23 adjoin end face plates 24 and 25 is greater than the clearance between the inside surface of walls 19 and the edges of lobes 22 and 23 located farthest from end plate sections 24 and 25. Consequently, the large pressure surges which occur as the material is being sheared do not develop at the ends of chamber 18 with the result that there is less tendency for material to leak through clearances 29 and 31. While minimizing the leakage of material out of chamber 18, the improved rotor of FIG. 3 gives substantially the same mixing and masticating results as are achieved with the conventional rotor shown in FIG. 2.

As will be readily recognized by those skilled in the art, notch 30 is only one way to achieve the improved rotor described herein. All that is necessary is that the lobes be of a design such that the distance between the internal wall of the mixing chamber and the edges of the lobes nearest the end plate sections be greater than the distance between the internal wall of the chamber and the edges of the lobes farthest from the end plate sections. This can be achieved in several different ways, a notch being easiest to accomplish on rotors in existing equipment. The notch need not be of any particular shape but can be rectangular or have a curved surface. Whatever the shape of the notch, it has been found preferable that it have a length of from 10 to 20 percent of the total length of the edge of the lobe into which it is cut and a depth of at least 2 percent of the perpendicular distance from the edge of the lobe in which it is cut to the center of the cylindrical portion of the rotor. This perpendicular distance is referred to as the major radius of the rotor, the radius of the cylindrical portion per se being referred to as the minor radius. Obviously, the notch can have a maximum depth equal to the difference between the length of the major radius and length of the minor radius.

The improved rotor of the present invention also encompasses a rotor wherein each of the lobes is continuously tapered from the point farthest from the end plate sections to the ends of the lobes terminating at those sections. As can be seen, this tapering can be such that the distance between the internal wall of the chamber and the edges of the lobes located nearest the end plate sections is substantially equal to the perpendicular distance from the edges of the lobes located farthest from the end plate sections to the cylindrical surface of the rotor. Also, depending on the mixing pattern desired within the chamber, the continuous tapering can be uniform or non-uniform such that a planar projection of the lobe would appear as a portion of a circle, for example, in the case of uniform tapering, or a portion of a parabola, ellipse or the like in the case of non-uniform tapering. The particular choice of tapering will depend on the material being mixed and the desired mixing action.

While not absolutely necessary, it is preferable that the lobes on the rotors be of unequal length. This contributes to the overall mixing ability of the rotor and insures a more homogeneous product. As is well known, both the chamber housing and the rotors can be cored whereby the chamber and rotors can be heated or cooled by the use of suitable heat-transfer mediums. The rotor finds particular utility in intensive mixers of the batch type commonly referred to as Banbury mixers.

What is claimed is:

1. In an intensive mixer of the type having a stationary mixing chamber, said chamber having a substantially figure-eight-shaped cross-sectional area, mixing means rotatably mounted in each half of said chamber to impart mixing and shearing of material contained therein, the improvement whereby leakage of said material out of said chamber is substantially reduced wherein said mixing means comprises a substantially cylindrical rotor having a pair of substantially spiral lobes located diagonally from one another across the long axis of said rotor, said rotor having an end face plate section on each end abutting the ends of said chamber, the lobes terminating at said end face plate sections, the distance between the internal wall of said chamber and the edges of the lobes nearest the end face plate sections being greater than the distance between the internal wall of said chamber and the edges of the lobes located farthest from said end face plate sections, the distance between said internal wall of said chamber and the edges of said end face plate sections being substantially equal to the distance between said internal wall and said edges of said lobes located farthest from said end face plate sections.

2. The rotor of claim 1 wherein each edge of said lobes has a notch adjacent said end plate section, said notch having a length of from 10 to 20 percent of the total length of the edge of the lobe, said notch having a depth of at least 2 percent of the perpendicular distance from the edge of the lobe to the center of the cylindrical portion of said rotor.

3. The rotor of claim 1 wherein said lobes are continuously tapered, the distance between said internal wall of said chamber and the edges of said lobe nearest said end face plate sections being greater than the distance between the internal wall of said chamber and said edges of said lobes located farthest from said end plate face sections.

4. The rotor of claim 3 wherein said lobes are uniformly tapered.

5. The rotor of claim 3 wherein said distance between said internal wall of said chamber and said edges of said lobes located nearest said end face plate sections is substantially equal to the perpendicular distance from the edges of said lobes located farthest from said end face plate sections to the cylindrical surface of said rotor.

6. The rotor of claim 1 wherein said lobes of are different length.

* * * * *